(12) United States Patent
Schindler et al.

(10) Patent No.: US 9,610,666 B2
(45) Date of Patent: Apr. 4, 2017

(54) LIFTING APPARATUS HAVING A TOGGLE LEVER MECHANISM

(71) Applicant: Walter Maschinenbau GmbH, Tuebingen (DE)

(72) Inventors: Daniel Schindler, Filderstadt (DE); Simon Kümmerle, Ammerbuch (DE)

(73) Assignee: Walter Maschinenbau GmbH, Tuebingen (DE)

( * ) Notice: Subject to any disclaimer, the term of this patent is extended or adjusted under 35 U.S.C. 154(b) by 0 days.

(21) Appl. No.: 14/422,966

(22) PCT Filed: Jun. 25, 2013

(86) PCT No.: PCT/EP2013/063246
§ 371 (c)(1),
(2) Date: Feb. 20, 2015

(87) PCT Pub. No.: WO2014/029529
PCT Pub. Date: Feb. 27, 2014

(65) Prior Publication Data
US 2015/0239085 A1   Aug. 27, 2015

(30) Foreign Application Priority Data
Aug. 20, 2012  (DE) .......................... 10 2012 107 611

(51) Int. Cl.
*B23Q 3/18*          (2006.01)
*B23Q 7/00*          (2006.01)
(Continued)

(52) U.S. Cl.
CPC .............. *B23Q 7/005* (2013.01); *B23Q 1/25* (2013.01); *B23Q 16/001* (2013.01)

(58) Field of Classification Search
CPC   B25B 5/061; B25B 5/097; B25B 1/08; B25B 1/14
(Continued)

(56) References Cited

U.S. PATENT DOCUMENTS 1,393,247 A * 10/1921 Sauer ...................... B66F 3/12
                                                        254/126
2,327,368 A *  8/1943 Olson ...................... B25B 7/04
                                                        269/228
(Continued)

FOREIGN PATENT DOCUMENTS

CN        101001797 A      7/2007
DE             36709 U1    9/1886
(Continued)

OTHER PUBLICATIONS

International Search Report for corresponding PCT application No. PCT/2013/063246, dated Aug. 13, 2013, 4 pages.
(Continued)

*Primary Examiner* — Monica Carter
*Assistant Examiner* — Nirvana Deonauth
(74) *Attorney, Agent, or Firm* — Fitch Even Tabin & Flannery LLP

(57) ABSTRACT

A lifting apparatus includes a lifting part that can be moved in linear direction between a rest position and a working position. At least one drive device is disposed for moving the lifting part. Each drive device includes a toggle lever mechanism, having a first toggle supported pivotally on the lifting part and a second toggle supported on a base part. A positioning device prespecifies the position of the lifting part in lifting direction and in a direction transverse to lifting direction in working position. To do so, said toggle preferably has a stop surface against which the lifting part is pushed into working position by the at least one drive
(Continued)

device. In this working position, the toggle joint angle α of the toggle lever mechanism is smaller than 180° so that the two toggles and are outside the extended position.

13 Claims, 6 Drawing Sheets

(51) Int. Cl.
  *B23Q 1/25* (2006.01)
  *B23Q 16/00* (2006.01)
(58) Field of Classification Search
  USPC .............. 269/228, 32, 24–27, 254 CS, 93 R
  See application file for complete search history.

(56) References Cited

U.S. PATENT DOCUMENTS

| | | | | |
|---|---|---|---|---|
| 2,483,597 | A | * | 10/1949 | Schogren ................. B21J 13/02 269/163 |
| 3,226,086 | A | * | 12/1965 | Lavieri ................. B60P 1/4414 254/124 |
| 3,642,250 | A | * | 2/1972 | Klopp ...................... B66F 7/08 254/124 |
| 3,689,058 | A | * | 9/1972 | Schraner ................. B25B 5/122 269/157 |
| 3,904,853 | A | * | 9/1975 | Shoup .................. B66F 7/0625 235/51 |
| 4,347,754 | A | * | 9/1982 | Wehler .................... F16H 21/44 269/32 |
| 4,450,935 | A | * | 5/1984 | Gustavus ................. E06C 7/16 182/121 |
| 4,879,849 | A | | 11/1989 | Hollingsworth |
| 4,946,209 | A | | 8/1990 | Stauner |
| 5,169,112 | A | * | 12/1992 | Boyles .................. B60N 2/501 248/406.2 |
| 2008/0028973 | A1 | | 2/2008 | Hayashi |

FOREIGN PATENT DOCUMENTS

| | | |
|---|---|---|
| DE | 2526040 A1 | 12/1976 |
| DE | 2913506 A1 | 10/1980 |
| DE | 3604255 A1 | 8/1987 |
| EP | 0330054 A1 | 8/1989 |
| EP | 2565147 A1 | 3/2013 |
| GB | 831541 A | 3/1960 |
| JP | S5494700 U | 7/1979 |
| JP | S6022210 U | 2/1985 |
| JP | S61169530 U | 10/1986 |
| JP | S62120926 U | 7/1987 |
| JP | H01244078 A | 9/1989 |
| JP | H05237844 A | 9/1993 |
| JP | H6263312 A | 9/1994 |
| JP | 2000211897 A | 8/2000 |
| JP | 2006312177 A | 11/2006 |
| WO | 2004002872 A1 | 1/2004 |

OTHER PUBLICATIONS

Office action in corresponding Australian Application No. 2013304707, dated Feb. 2, 2016, 2 pages.
Office action in corresponding European Application No. 13 731 337.5, dated Apr. 14, 2016, 7 pages.
Office action and search report in corresponding Chinese Application No. 201380054449.X, dated Mar. 22, 2016, 13 pages.
Office action in corresponding Japanese Application No. 2015-527815, dated Feb. 23, 2016, 9 pages.
Search report in corresponding Japanese Application No. 2015-527815, dated Feb. 12, 2016, 41 pages.
Office action in corresponding German Application No. 10 2012 107 611.1, dated Apr. 30, 2013, 10 pages.
Second Office Action in corresponding Chinese Application No. 201380054449.X, dated Dec. 2, 2016, 10 pages.

* cited by examiner

LIFTING APPARATUS HAVING A TOGGLE LEVER MECHANISM

CROSS REFERENCE TO RELATED APPLICATIONS

This patent application is the national phase of PCT/EP2013/063246 filed Jun. 25, 2013, which claims the benefit of German Patent Application No. DE 102012107611.1 filed Aug. 20, 2012.

TECHNICAL FIELD

The invention relates to a lifting apparatus having a lifting part that is movable in a linear manner between a working position and a rest position.

BACKGROUND

Provided on the lifting part is a support unit and/or a clamping unit for supporting or clamping in place a workpiece. The support unit, for example, may be a stay disposed for supporting a cylindrical workpiece. The clamping unit may comprise, for example, a tailstock or a similar clamping means in order to clamp in place a workpiece, in particular, in axial direction. Preferably, the lifting apparatus is disposed for use in grinding machines for grinding cylindrical workpieces.

For example, a lifting table is known from publication DE 36 709 U1. The lifting table comprises a table top, a base part and a lever arrangement with four levers that are hinged next to each other to form a closed circle. One of the joints of the lever arrangement is arranged on the table top, and the opposite joint is arranged on the base part. The other joints are free joints. At least one toggle lever mechanism is actuated via a drive in order to lift or lower the table top relative to the base part. A pushrod of the drive connects the toggle joint of the toggle lever mechanism with the free links of the lever arrangement.

In doing so, the drive is supported by the lever arrangement between the base part and the table top and moved along as the table top is being moved in lifting direction. This is not favorable, because the mass of the drive must also be completely moved along. Furthermore, it has been found that the start-up of the working position of such lifting tables is too inaccurate for many applications. In particular, when workpieces are supported or mounted in precision machines, the accurate adjustment of the working position of the lifting part of the lifting apparatus to a few micrometers must be possible.

SUMMARY

Therefore, it can be viewed as the object of the present invention to provide a lifting apparatus that achieves high accuracy at the start-up of the working position of the lifting part that is moved in a lifting direction.

The lifting apparatus comprises a drive device arranged on a base part. The drive device comprises a drive coupled with a toggle lever mechanism. A first toggle lever of the toggle lever mechanism is hinged to the lifting part, and the other toggle lever of the toggle lever mechanism is hinged to the base part. Preferably, the drive acts on the toggle joint of the toggle lever mechanism. The working position of the lifting part is prespecified by a positioning device. In particular, the positioning device defines the maximum distance between the lifting part and the base part, so that, when the lifting part is moved in lifting direction away from the base part, the working position can be exactly approached. In order to hold the lifting part exactly in the desired working position, the positioning device is adjusted or set relative to the toggle lever mechanism in such a manner that the toggle levers are outside their extended position when the lifting part has reached the working position. In particular, the extended position of the toggle levers is not reached during the entire movement between the rest position and the working position of the lifting part. The toggle joint angle between the two toggle levers is preferably 30° to 40° in rest position and 170° to 178° in working position.

As a result of the fact that the toggle levers of the toggle lever mechanism subtend an angle of less than 180° in working position, a sufficiently great force can be applied to the lifting part in lifting direction via the drive of the at least one drive device and via the toggle lever mechanism, so that the lifting part is pushed precisely into the position defined by the positioning device. In this manner, the working position of the lifting part is exactly achieved, independent of the play prevailing in the drive device.

Preferably, the toggle lever mechanism comprises the at least one drive device consisting of only two toggle levers, each of said toggle levers extending in particular in a straight line between two bearing points. Therefore, the toggle lever mechanism comprises, in addition to the toggle joint, preferably only two bearing points.

In a preferred embodiment, the positioning device has an stop surface facing the lifting part, said stop surface—in working position—contacting a contact surface of the lifting part. Preferably, the stop surface and the contact surface are in contact with one another only in working position. Outside the working position, the positioning device preferably does not affect the position of the lifting part. The positioning device and the lifting part are made of steel, in particular. In doing so, the working position can be defined particularly well.

It is of advantage if the positioning device comprises an adjustment device for adjusting the distance between the base part and the stop surface. In this manner, the working position of the lifting part can be adjusted and adapted to the requirements of the machine tool. For a precise adjustment, the adjustment device may comprise a differential screw. For example, it is possible with the use of this differential screw to adjust an abutment part of the positioning device, where the stop surface is provided, in the desired position relative to a pylon of the positioning device connected to the base part in lifting direction.

In order to fix the stop surfaces in place, a clamping screw arranged transversely to the differential screw can be tensioned and secured against inadvertent rotation.

It is also possible for the pylon of the positioning device to extend through a cutout in the lifting part, i.e., in particular, abut against the lifting part.

In a preferred embodiment, at least one positioning projection is provided on the stop surface and/or contact surface, said positioning projection interacting with an associate positioning indentation on the respectively other side. The positioning projection and/or the positioning indentation, viewed in cross-section, may be prism-shaped, for example, triangular or trapezoid. In doing so, the contact surface and the stop surface may only be the respectively inclined surfaces of the at least one positioning projection or the respectively associate positioning indentation.

In particular, the at least one positioning projection comes into engagement with the respectively associate positioning indentation when the lifting part is in its working position.

As a result of this, the lifting part—viewed transversely or radially to lifting direction—can be positioned in a precisely defined position relative to the positioning device. By means of forces introduced into the lifting part via the drive device in transverse direction to lifting direction it is thus possible to support the positioning device. A guide arrangement that is optionally provided for guiding the lifting part in a sliding manner in lifting direction is thus not subjected to transverse forces when the lifting arrangement pushes the lifting part into the working position.

By means of the at least one positioning projection and the at least one associate positioning indentation, it is possible to achieve a play-free micrometer-accurate positioning of the lifting part in working position. In particular, in working position of the lifting part, it is only the inclined surfaces of the at least one positioning projection of the stop surface and/or the contact surface that abut against the associate inclined surfaces of the at least one positioning indentation of the respectively other surface. The working position of the lifting part can be repeatedly started up with micrometer-accuracy.

In one embodiment, several drive devices, for example two drive devices, may be present. Each drive device comprises a drive and a toggle lever mechanism, wherein the drive devices are configured the same, in principle. The toggle lever mechanisms of the two drive devices may be arranged, for example, on two opposite sides of the positioning device or of the pylon of the positioning device. As a result of this, it is possible to achieve a good distribution of forces or introduction of forces. The drives of the plurality of drive devices may be connected in parallel, so that the sum of the driving forces of all drives is transmitted over each and every toggle lever mechanism.

The drive device may either comprise a controllable drive or also a manually operable drive. The controllable drive has the advantage that the lifting part can be automatically moved between the rest position and the working position during the operation of the machine tool or while a workpiece is being machined. In a preferred exemplary embodiment, the controllable drive may be a double-acting fluid cylinder. Preferably, a pneumatic cylinder is used. The piston rod of the fluid cylinder may act on the toggle joint of the toggle lever mechanism. In doing so, the cylinder housing of the fluid cylinder may be pivotally supported on the base part. The use of air for the actuation of the fluid cylinder is not problematic because—while the air is compressible—the working position of the lifting part can be precisely maintained due to the positioning device when the pneumatic cylinder pushes the lifting part into the working position via the toggle lever mechanism. Due to the relatively large toggle joint angle of more than 170° and preferably more than 175°, the force with which the lifting part is moved into the working position and, in particular, against the stop surface, is sufficiently great.

When the lifting part is being moved out of the rest position into the working position, the speed of the lifting part decreases if the piston rod of the fluid cylinder is moved in a uniform manner. This has the advantage that the working position is reached at a reducing lifting speed, and a softer stop of the lifting part in working position is achieved by means of the positioning device. In addition, fluid lines connected to the fluid cylinder may comprise one or more throttles in order to limit the movement speed of the piston rod. The movement of the piston rod is controlled via the pressure on a fluid control unit that, for example, is a component of the machine control.

The at least one drive device may additionally comprise a fluid control unit that is disposed to apply a fluid pressure to the fluid cylinder or to the affected working chamber of a fluid cylinder, regardless of whether the lifting part is in working position or in rest position. As a result of this, it is ensured that the lifting part is held with sufficiently great force in working position or in rest position and that precise positioning is achieved.

If several drive devices are provided, the fluid control unit may be configured as a common fluid control unit for all drive devices.

Furthermore, it is advantageous if at least one drive device comprises a sensor unit for detecting the working position and/or the rest position. For example, the double-acting fluid cylinder may comprise end position switches.

Furthermore, it is of advantage if there is an auxiliary drive in addition to the at least one drive device. The auxiliary drive comprises, in particular, a deformable body that may be, for example, a helical spring, leaf spring or an elastomer body or the like. In rest position of the lifting part, the deformable body, for example the spring, can be deformed and preferably compressed, and thus applies an auxiliary force on the lifting part or an element that is connected to the lifting part. The auxiliary force acts on or pushes the lifting part out of the rest position into lifting direction. By means of this auxiliary force of the auxiliary drive, the movement of the lifting part out of the rest position is supported. Due to the small toggle lever mechanism angle in rest position, the lifting force effected by the at least one drive device in lifting direction is small so that the drive of the drive device would have to generate a considerable total force in order to reach sufficient lifting force. This, however, could lead to undesirably great loads. Total forces of the drive of such magnitude could be reduced by providing the auxiliary drive.

Preferably, the auxiliary force is available not only in rest position but in any position of the lifting part. In rest position, the auxiliary force may display its greatest strength, and said strength may decrease with the increasing distance or movement of the lifting part toward the working position.

In a preferred embodiment of the lifting device, the lifting part is linearly guided over a guide arrangement. For example, the guide arrangement may comprise one or several guide rails extending in a straight line in lifting direction. Preferably, the guide rails are arranged on the side of the lifting part opposite the drive device.

Advantageous embodiments of the invention result from the dependent patent claims and the description. The description is restricted to the essential features of the invention. The drawings are to be used for supplementary reference. Hereinafter, exemplary embodiments of the lifting apparatus are explained in greater detail with reference to the attached drawings. They show in

DETAILED DESCRIPTION

Figure 1:
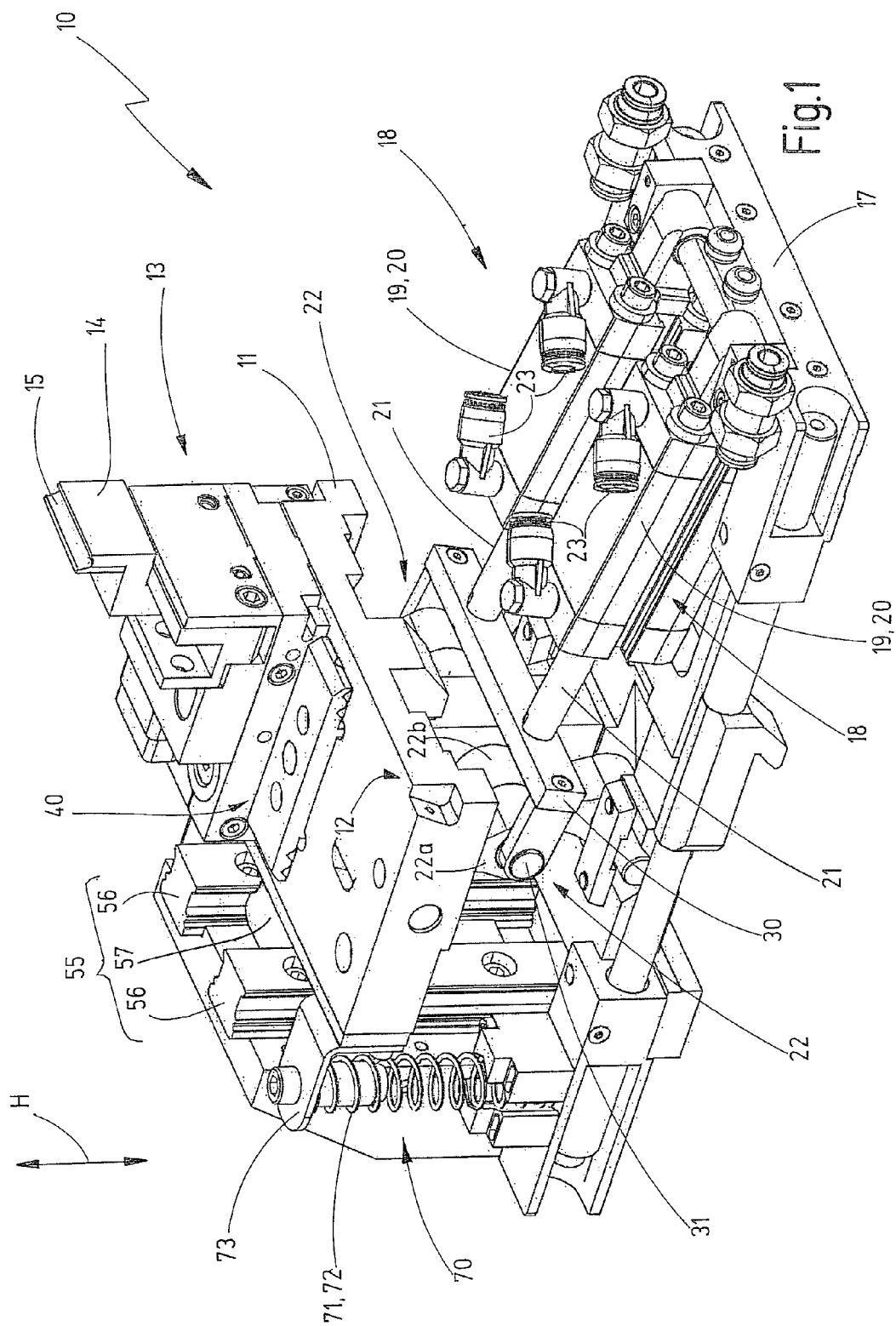
FIG. 1 a perspective representation of an exemplary embodiment of a lifting device, wherein the lifting part is in its working position.
Figure 2:
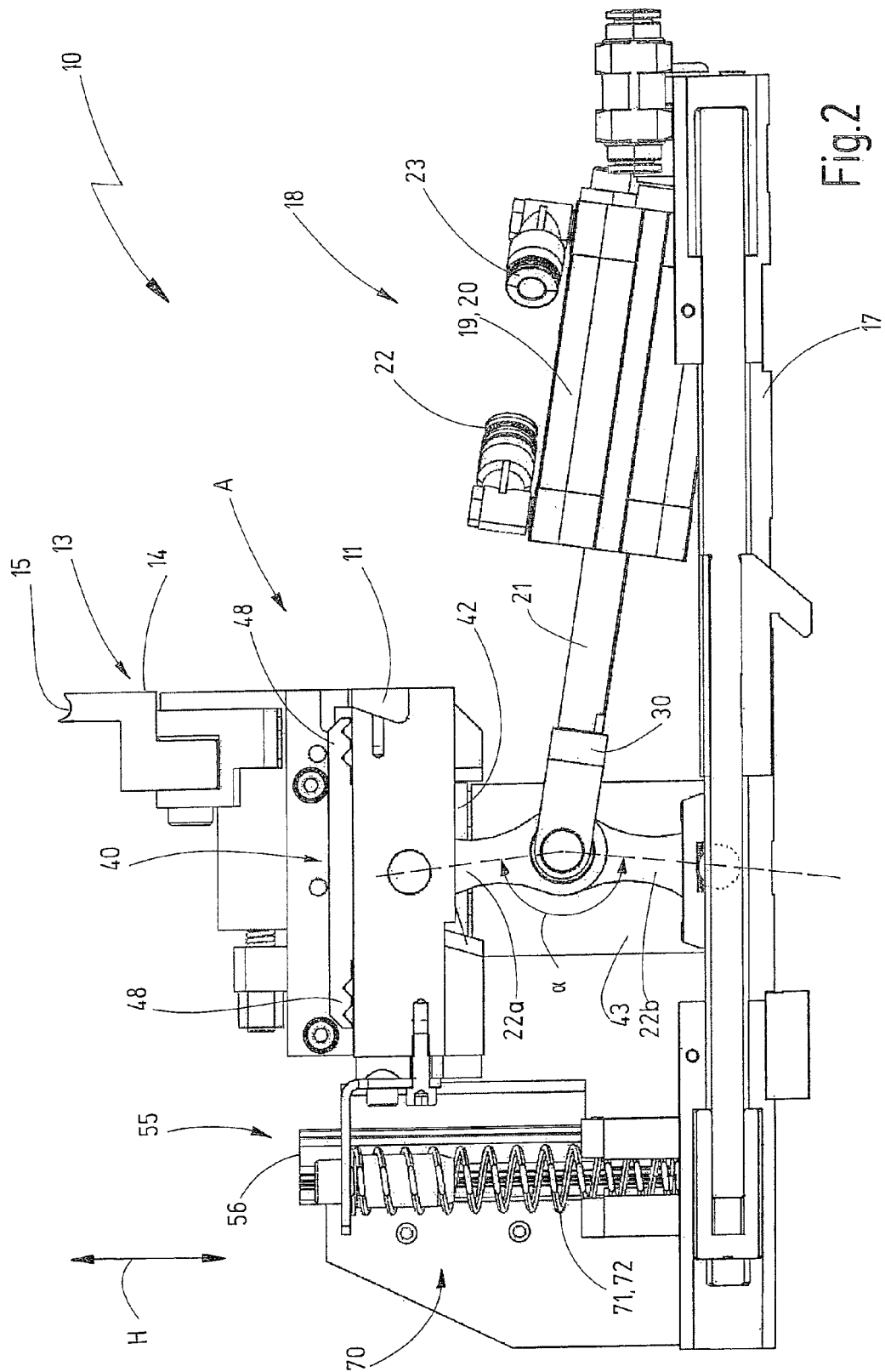
FIG. 2 a side view of the exemplary embodiment of the lifting apparatus as in FIG. 1.
Figure 3:
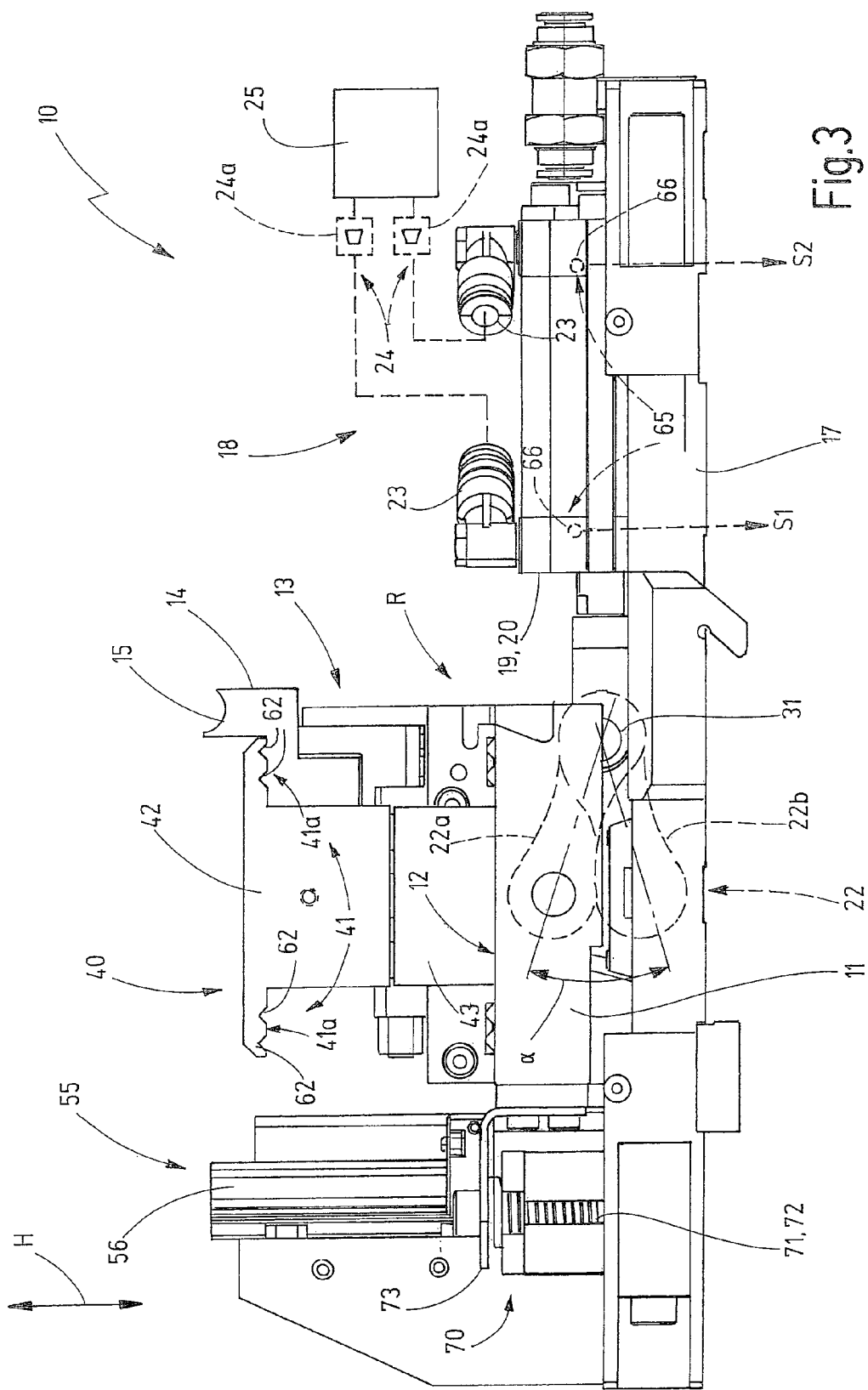
FIG. 3 a side view of the exemplary embodiment of the lifting apparatus in accordance with FIGS. 1 and 2, wherein the lifting part is in its rest position.

FIGS. 1 through 3 show a lifting apparatus 10 comprising a lifting part 11 that can be moved in a lifting direction H. The lifting part 11 is plate-shaped. Said lifting part comprises a mounting surface 12, to which can be mounted a support unit 13—as in the exemplary embodiment shown herein—and/or a chuck unit. The support unit 13 comprises a support part 14 with a support indentation 15 whose cross-section may be arched or prism-shaped. A not specifically shown workpiece in the support recess 15 can be partially circumscribed and supported in its axial extension direction. In this manner, it is possible to support workpieces mounted on one side in a chuck with the use of a support unit 13 at an axial distance from the chuck in order to avoid bending while said workpieces are being machined.

In modification of the illustrated exemplary embodiment, it would also be possible to use a chuck with a tailstock or the like on the lifting part 11. For example, it is possible with the use of a chuck to mount a free axial end of a workpiece in axial direction relative to a chuck. To accomplish this, the clamping unit can be supported on the lifting part so as to be drivable or slidable in a direction transverse to lifting direction H. Alternatively or additionally, it is also possible to support the entire lifting apparatus so as to be shiftable in a tensioning direction.

On the side opposite the mounting surface 12, the lifting part 11 has a driving side 16 that faces the base part 17. In the exemplary embodiment, the base part 17 is configured as a base plate. Arranged on the base part 17, there is at least one drive device 18 for moving the lifting part 11 in lifting direction H. In the exemplary embodiment described here, two drive devices 18 constructed in an equal manner are provided. Each drive device 18 comprises a drive 19 that, in accordance with the example, consists of a double-acting fluid cylinder 20. Each fluid cylinder 20 comprises two working chambers charged with pressurized air, said chambers being fluidically separated from one another by the piston. The piston is connected to a piston rod 21, said piston rod projecting on one end from the cylinder housing. The free end of the piston rod 21 is coupled with a toggle lever mechanism 22 and is in contact, for example, with a toggle joint 31 of the toggle lever mechanism 22. In this manner, by moving the piston rod 21 in and out via the toggle lever mechanism, it is possible for the fluid cylinder 20 to move the lifting part 11 into lifting direction H.

In order to act on the working chambers, each fluid cylinder 20 has two fluid ports 23. Via the fluid lines 24 that are schematically shown in FIG. 3, the fluid ports are connected to a fluid control unit 25. Via the fluid control unit 25, the fluid pressure is supplied to one or the other working chamber of the double-acting fluid cylinder 20. On the end opposite the free end of the piston rod 21, the cylinder housing is pivotally supported on the base part 17.

Instead of the pneumatic fluid cylinder 20, it would also be possible to alternatively provide hydraulic cylinders. Alternatively to the cylinders described here, it would also be possible to use other controllable drives 19, for example, electric motors, linear motors or the like, as the drive 19 for the drive device 18. Furthermore, it is also possible to provide—instead of a controllable drive 19—a manually actuated drive and couple it with the associate toggle lever mechanism 22. This may be an actuating lever arrangement, for example.

As is particularly obvious from FIG. 1, the two drives 19 are connected in parallel, so to speak, so that the driving force of each drive 19 acts on both toggle lever mechanisms 22, respectively. In accordance with the example, there is a connecting piece 30 which connects the two free ends of the piston rods 21 with one another and which is coupled with both toggle joints 31 of the toggle lever mechanism.

Figure 4:
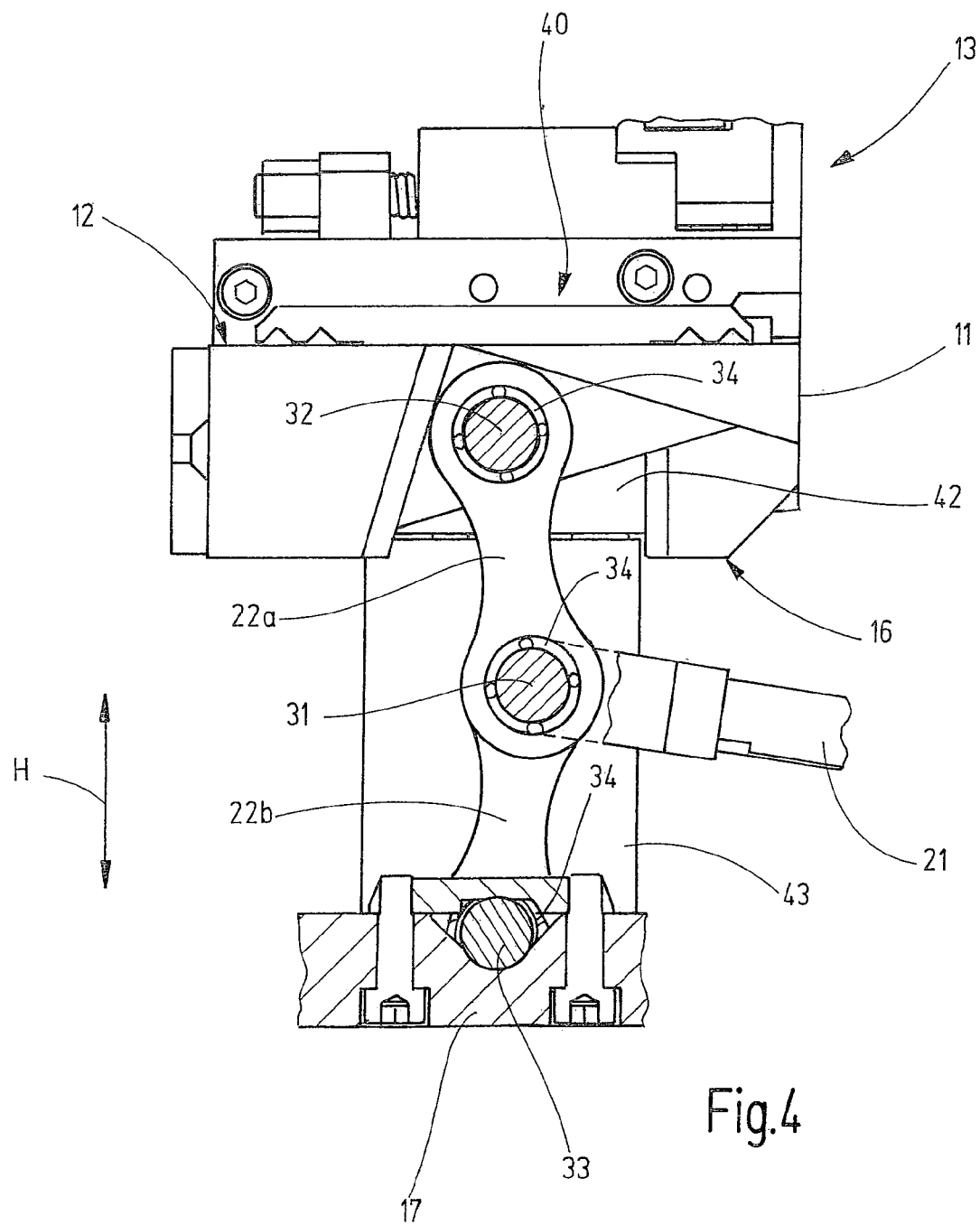
FIG. 4 a representation of a detail of the bearing points of the toggle lever mechanism of a drive device of the lifting apparatus as in FIGS. 1 through 3.

The toggle lever mechanism 22 of a drive device 18 comprises a first toggle lever 22a hinged to the lifting part 11 as well as a second toggle lever 22b hinged to the base part 17. The two toggle levers 22a, 22b of a toggle lever mechanism 22 are supported in a hinged manner next to each other on the toggle joint 31. Consequently, each toggle lever mechanism 22 comprises three bearing points. A first shaft 32 mounted to the lifting part 11 and being accessible at least in sections from the driving side 16 of the lifting part 11 is disposed for bearing the first toggle lever 22a. Preferably, the first shaft 32 is disposed for the hinged bearing of two first toggle levers 22a of the two toggle lever mechanisms 22. In lifting direction H below the first shaft 32, a second shaft 33 is supported on the base part 17 and is accessible at least in sections. In the exemplary embodiment, the second shaft 33 is disposed for the hinged support of the two second toggle levers 22b on the base part 17. FIG. 4 shows the three bearing points of the toggle lever mechanism 22. The toggle lever mechanism 22 has a needle bearing 34 at each bearing point. The needle bearings 34 are sealed with respect to the environment, for example by radial shaft seal rings.

Each of the toggle levers 22a, 22b connects its two bearing points in a straight line. Essentially, they have the shape of a bone.

The two drive devices 18 move the lifting part 11 between a rest position R (FIG. 3) and a working position A (FIG. 2). In rest position R, the lifting part 11 is at the smallest distance from the base part 17 and contacts the base part 17, as in the example. In this rest position R, the toggle joint angle α subtended by the toggle levers 22a, 22b is approximately 30° to 35°. In rest position R, the longitudinal axis of the piston rod 21 forms the bisector of the toggle joint angle α. In rest position R of the lifting part 11, the piston rod 21 extends approximately at a right angle with respect to lifting direction H.

Inasmuch as the distance of the toggle joint 31 increases relative to the base part 17 during the movement of the lifting part 11 out of the rest position R into the working position A, the cylinder housings of the fluid cylinders 20 are pivotally supported on the base part 17. By moving out the piston rod 21, the toggle levers 22a, 22b erect and the subtended toggle joint angle α becomes larger. In working position A, the toggle joint angle α has its maximum value and is smaller than 180°. Consequently, the toggle levers 22a, 22b also do not assume their extended position in working position (toggle joint angle α=180°). In the entire range of motion of the lifting part 11 from the rest position R into the working position A, the toggle joint angle α is at all times smaller than 180°. In the exemplary embodiment, the toggle joint angle α is approximately 175° to 178° in the working position A.

The working position A of the lifting part 11 is prespecified by a positioning device 40. In so doing, the positioning device 40 defines the maximum distance between the lifting part 11 and the base part 17.

In the exemplary embodiment described here, the positioning device comprises a stop surface 41 facing the lifting part 11 and, as in the example, facing the mounting surface 12. In the exemplary embodiment, the stop surface 41 is provided on an abutment part 42. The abutment part 42 is arranged on a pylon 43 of the positioning device 40.

By means of an adjustment device 44, the abutment part 42 is adjustably supported on the pylon 43 in the adjustment direction H. A differential screw 45 shown in FIG. 7 belongs to the adjustment device 44. This differential screw 45 connects the abutment part 42 with the pylon 43 so that a highly precise adjustment of the distance between the stop surface of the abutment part and the base part 17 is possible. The abutment part 42 is guided over two pins 46 extending parallel to the differential screw 45 in the guide cutouts on the pylon 43. A clamping screw extending transversely to lifting direction H and fixing the position of the abutment part 42 relative to the pylon 43, for example, by preventing any adjustment or torquing of the differential screw 45, is used for locking the adjusted position of the abutment part 42 in place.

Figure 6:
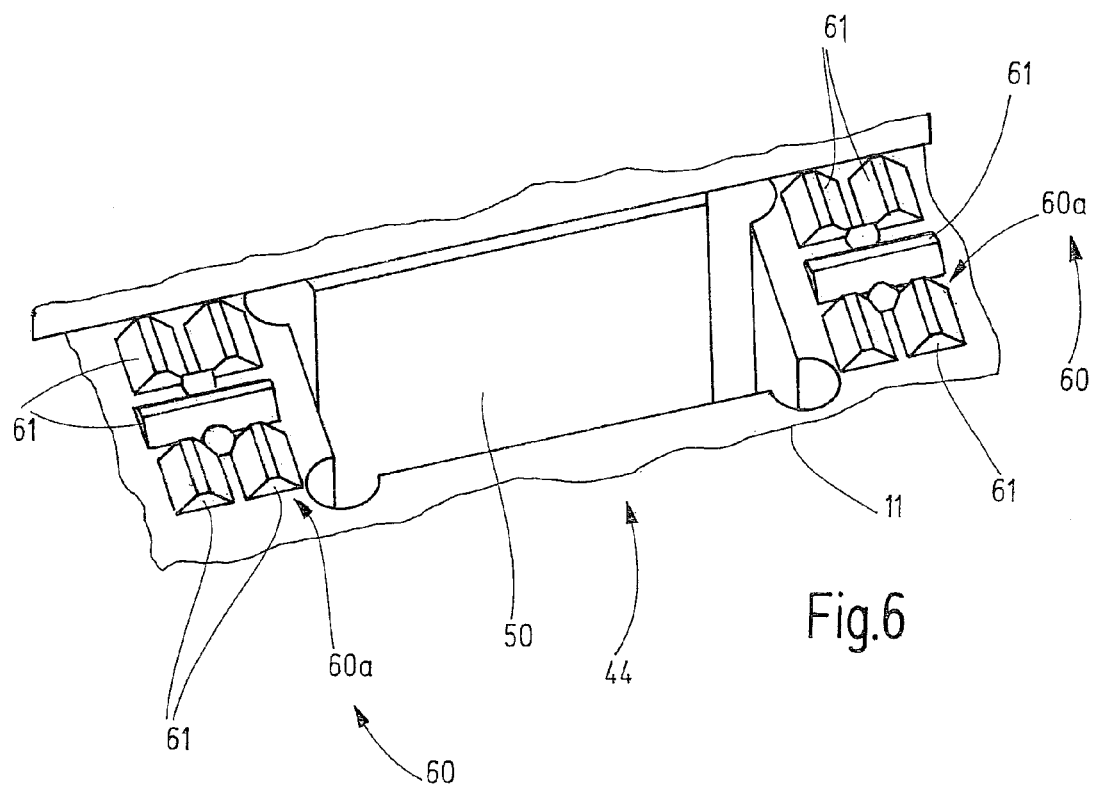
FIG. 6 a perspective view of an stop surface on the lifting part associated with an stop surface of the positioning device.
Figure 7:
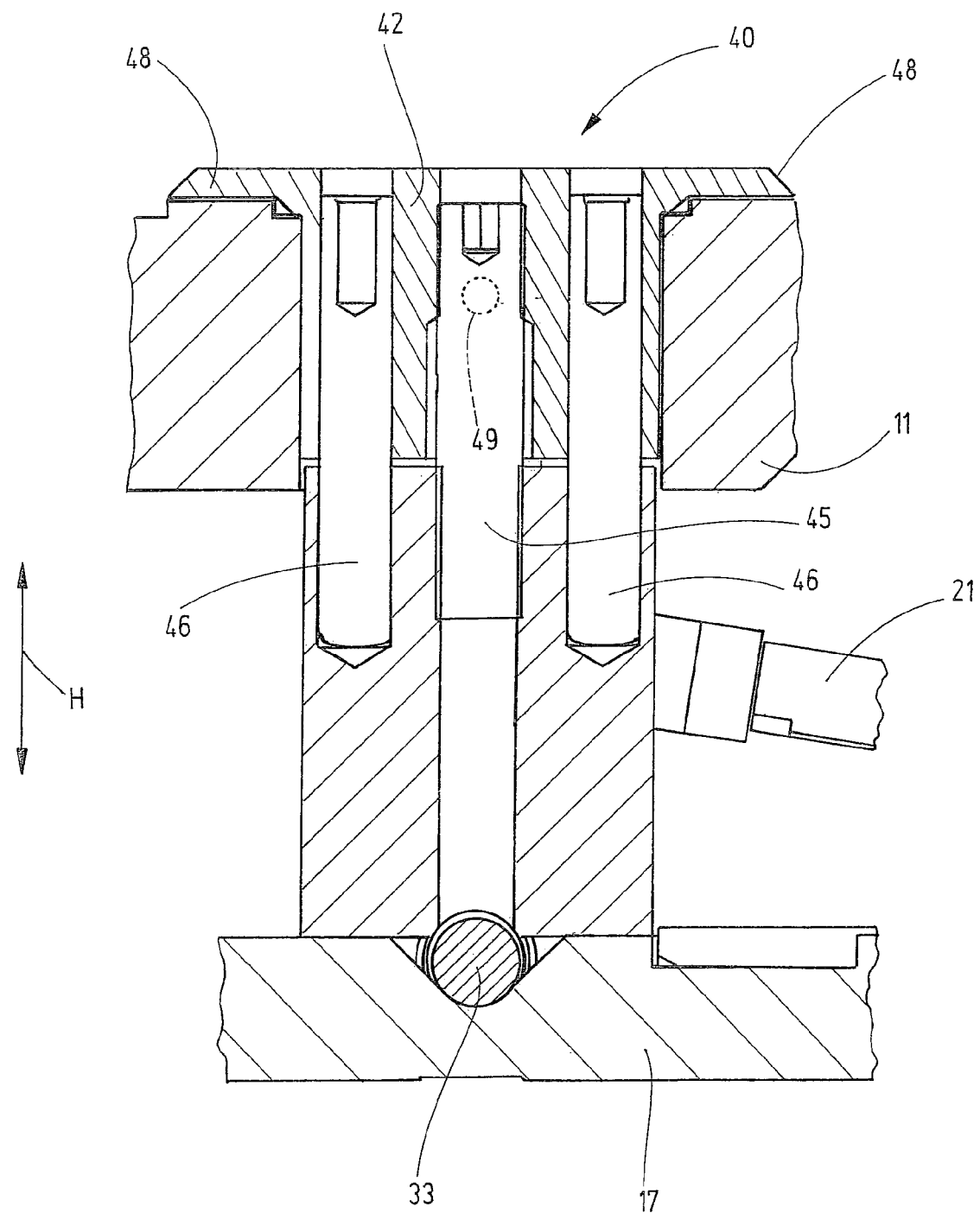
FIG. 7 a sectional view of an exemplary embodiment of a positioning device comprising an adjustment device.

The illustration of FIG. 6 is incomplete and does not show the abutment part 42. The differential screw 45 and the pins 46 of the adjustment device 44 are shown in FIG. 7.

The abutment part 42 comprises a parallelepipedal section 47 in extension of the pylon 43. On the end facing away from the pylon 43, the two transverse parts 48 extend transversely to lifting direction H in opposite directions away from this parallelepipedal section 47. As a result of this, the abutment part 42 is provided with an overall T-shape. Each transverse part 48 is provided, on the side facing the base part 17 or the lifting part 11, with a section 41a of the stop surface 41. Consequently, the stop surface 41 is not cohesive but consists of two spaced apart sections 41a on respectively one transverse part 48.

The lifting part 11 has a cutout 50 shown in FIG. 6. Through this cutout 50 extends the pylon 43 in rest position R and the parallelepipedal section 47 of the abutment part 42 in working position A. For better illustration, FIG. 6 does not show the pylon 43 and the abutment part 42. Pylon 43 and the parallelepipedal section 47 of the positioning device 40, respectively, are not disposed for guiding the lifting part 11 in lifting direction H but only extend through it through the cutout 50. A gap may exist in the region of the cutout 50 between the positioning device 40 and the lifting part 11, so that, in rest position R of the lifting part 11 and during the movement of the lifting part 11 in lifting direction H, there is no guide contact between the positioning device 40 and the lifting part 11.

A guide arrangement 55 that, in the exemplary embodiment comprises two guide rails 56 extending parallel to one another in lifting direction H, is disposed for guiding a lifting part 11 in lifting direction H. A guide part 57 extends around said rails, said guide part being rigidly connected to the lifting part 11.

Figure 5:
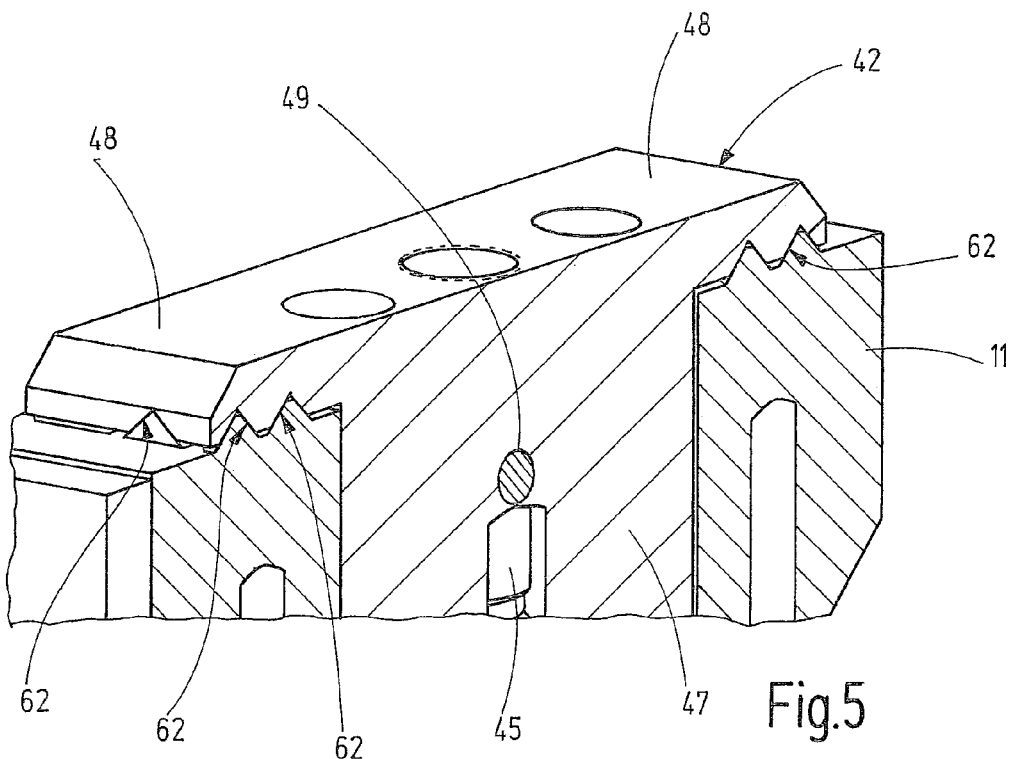
FIG. 5 a representation of a detail of an abutment part of an exemplary embodiment of a positioning device of the lifting apparatus as in FIGS. 1 through 3.

The stop surface 41 of the positioning device 40 and, as in the example of the abutment part 42, is associated with a contact surface 60 on the lifting part 11, wherein the contact surface 60 in the exemplary embodiment is represented by a section of the mounting surface 12. FIGS. 5 and 6 show the contact surface 60 particularly well. Corresponding to the stop surface 41, the contact surface 60 also comprises two spaced apart, separate surface sections 60a, each being associated with a section 41a of the stop surface 41. If the lifting part 11 is in its working position A, the contact surface 60 abuts against the stop surface 41.

Referring to the preferred exemplary embodiment shown herein, neither the contact surface 60 nor the stop surface 41 is configured as a flat surface, this also being possible in modification of the exemplary embodiment. For example, the contact surface 60 of the lifting part 11 is arranged on several positioning projections 61. Each positioning projection 61 is associated with a positioning indentation 62, in which case the stop surface 41 is provided on these positioning indentations 62. In working position A of the lifting part 11, each positioning projection 61 comes into engagement with the associate positioning indentation 62.

In modification of the depicted embodiment, it would also be possible to provide the stop surface 41 either on the positioning projections 61 or on the positioning projections 61 and the positioning indentations 62, in which case the contact surface 60 may be provided corresponding to the associate positioning indentations 62 or on the positioning indentations 62 and the positioning indentations 61.

In the exemplary embodiment shown here, the positioning projections 61 have a prismatic and, for example, trapezoidal shape—when viewed in cross-section. They taper away from the lifting part 11. The associate positioning indentations 62 have a cross-section adapted to the cross-sectional form of the positioning projections 61, said cross-section having a triangular form in the exemplary embodiment. Due to the triangular cross-section of the positioning indentations 62 and the trapezoidal cross-section of the positioning projections 61, a small free space remains with respect to the engaging positioning projection 61 in working position A of the lifting part 11 at the bottom of each positioning indentation 62, as is obvious from FIG. 5. The abutment part 42 and the lifting part 11 abut against one another only on the respective inclined surfaces of the positioning projections 61 and the positioning indentations 62, the latter thus forming the stop surface 41 or the contact surface 60.

Due to this design of the contact surface 60 and the stop surface 41, it is possible to achieve a highly precise positioning of the lifting part 11 relative to the positioning device 40 and, as in the example, relative to the abutment part 42. The prism-shaped positioning projections 61 in the exemplary embodiment extend at a right angle relative to lifting direction H. In the exemplary embodiment at least one of the prism-shaped positioning projections 61 extends at a right angle to the other positioning extensions 61. As a result of this, the position of the lifting part 11 is exactly prespecified by the positioning device 40 in working position A radially with respect to lifting direction H.

A fluid pressure is applied to each fluid cylinder 20 of the two drive devices 18 by means of the fluid control unit 25, so that the contact surface 60 of the lifting part 11 is pushed via the piston rod 21 and the two toggle lever mechanisms 22 against the stop surface 41 of the positioning device 40. The transverse forces transverse to lifting direction H acting on the lifting part 11, in so doing, are supported by the positioning indentations 62 in the abutment part 42 and thus do not act on the guide arrangement 55. In lifting direction H, as well as in a direction transverse to lifting direction H, an exact positioning of the lifting part 11 in working position A is achieved. This working position A can be approached with extremely high accuracy. As a result of this, it is ensured that, when the lifting part 11 is automatically moved between its rest position R and its working position A, the support unit 13 located on the lifting part 11 repeatedly assumes the prespecified desired position for supporting the associate workpiece in a highly exact manner. In the exemplary embodiment described here, the lifting part 11 and thus also the supporting unit 13 can be positioned with micrometer-accuracy in lifting direction H and in a direction transverse thereto.

As a result of the fact that the working position A is prespecified by the positioning device 40 in such a manner that the two toggle levers 22a, 22b of a toggle lever mechanism 22 are outside their extended position, it is possible to apply sufficient force to the lifting part 11 via the associate drive 19, said force being applied for pushing the lifting part 11 against the stop surface 41 of the positioning device 40 in working position A. Inasmuch as the toggle joint angle α in working position A is large, the usual pneumatic operating pressures in the range of 5 to 6 bar are sufficient to hold the lifting part 11 in working position A, said operating pressures being usually available anyhow in factory buildings.

When the lifting part 11 is being moved out of the rest position R into the working position A, the speed of the lifting part 11 in lifting direction H decreases as the toggle joint angle α increases, while the piston rod 21 is uniformly moved out. This is advantageous because the lifting part 11, despite the uniformly moved piston rod 21, abuts at a lower speed against the stop surface 41 of the positioning device 40. In the exemplary embodiment described here, the lifting speed of the lifting part 11 is further limited in that the fluid throttles 24a are inserted in the fluid lines 24 (FIG. 3).

Each drive device 18, or at least one of the drive devices 18 may comprise a sensor unit 65 for detecting the working position A and the rest position R of the lifting part 11. In the exemplary embodiment described here, the sensor unit 65 comprises two end-position switches 66 in the respective fluid cylinder 20, by means of which the position of the piston rod 21 or the piston in the cylinder housing can be detected, and thus the working position A and the rest position R of the lifting part 11 can be indirectly determined. When the working position A is reached, one of the end-position switches 66 delivers a first sensor signal S1. When the rest position R is reached, the respectively other end-position switch 66 of the fluid cylinder 20 delivers a second sensor signal S2.

In rest position R, the toggle joint angle α is relatively small so that the force exerted by the drive 19 on the toggle joint 31 of the toggle lever mechanism 22 generates only a minimal force component in lifting direction H. This may have the effect that a relatively great driving force is necessary in order to be able to move the lifting part 11 out of the rest position R. In order to be able to avoid the demand for relatively great driving forces via the driving unit 18 in rest position R of the lifting part 11, an auxiliary drive 70 is provided in the lifting apparatus 10 described here. The auxiliary drive 70 makes available an auxiliary force in lifting direction H, said auxiliary force—at least in rest position R—acting indirectly or directly on the lifting part 11. Consequently, the lifting motion of the lifting part 11 out of the rest position R into the working position A is supported by the auxiliary force of the auxiliary drive 70.

The auxiliary drive 70 comprises a deformable body 71 that is deformed and, in accordance with the example, compressed in rest position R, thus providing the auxiliary force in lifting direction H in rest position R. In the exemplary embodiment, the deformable body 71 is a compression spring or a helical spring 72 having a longitudinal axis extending in lifting direction H. The compression spring or helical spring 72 is arranged in the region of the guide arrangement 55 parallel to the guide rails 56. Its lower end is supported by the base part 17. The opposite end abuts against a support part 73 that, in accordance with the example, is directly mounted to the lifting part 11. The spring force applied by the compression spring or helical spring 72 in lifting direction H thus acts on the lifting part 11 via the support part 73.

In the exemplary embodiment described here, the support part 73 is in contact with the compression spring or helical spring 72 along the entire travel path of the lifting part 11. Therefore, the spring force or auxiliary force in lifting direction H increases or decreases over the entire lifting path of the lifting part 11. Consequently, any force surges caused by the auxiliary drive 70 in lifting direction H are avoided.

As an alternative to the exemplary embodiment described here, the deformable body 71 could also be a leaf spring or an elastomer body. It would also be possible for the deformable body 71 to be in contact with the support part 73 or another element connected to the lifting part 11 in only a specific toggle joint angle range starting from the rest position R. However, in this case, it would be possible for force surges of the auxiliary force to occur in lifting direction H.

The invention relates to a lifting apparatus 10 comprising a lifting part 11 that can be moved in linear direction between a rest position R and a working position A. The lifting part 11 carries a support unit 13 for a workpiece and/or a clamping unit for said workpiece. At least one drive device 18 and, in particular, two drive devices 18, are disposed for moving the lifting part 11. Each drive device 18 comprises a toggle lever mechanism 22, said toggle lever mechanism comprising a first toggle lever 22a supported pivotally on the lifting part 11 and a second toggle lever 22b supported on a base part 17. The two toggle levers 22a, 22b are pivotally supported next to one another on a common toggle joint 31. A drive 19 of the drive device 18 is in contact with the toggle joint 31. A positioning device 40 prespecifies the position of the lifting part 11 in lifting direction H and, in particular, also in a direction transverse to lifting direction H in working position A. To do so, said toggle lever preferably has an stop surface 41 against which the lifting part 11 is pushed into working position A by means of the at least one drive device 18. In this working position A, the toggle joint angle α of the toggle lever mechanism 22 is smaller than 180° so that the two toggle levers 22a and 22b of the toggle lever mechanism 22 are outside the extended position.

LIST OF REFERENCE SIGNS

10 Lifting device
11 Lifting part
12 Mounting surface
13 Support unit
14 Support part
15 Support recess
16 Driving side
17 Base part
18 Drive device
19 Drive
20 Fluid cylinder
21 Piston rod
22 Toggle lever mechanism
22a First toggle lever
22b Second toggle lever 23 Fluid port
24 Fluid line
24a Throttle
25 Fluid control unit
30 Connecting piece
31 Toggle joint
32 First shaft
33 Second shaft
34 Needle bearing
40 Positioning device
41 Stop surface
41a Section of the stop surface
42 Abutment part
43 Pylon
44 Adjustment device
45 Differential screw
46 Pin
47 Parallelepipedal section
48 Transverse part
49 Clamping screw
50 Cutout
55 Guide arrangement
56 Guide rail
57 Guide part
60 Contact surface
60a Area section of the contact surface
61 Positioning projection
62 Positioning indentation
65 Sensor unit
66 End-position switch
70 Auxiliary drive
71 Deformable body
72 Compression spring or helical spring
73 Support part
α Toggle joint angle
A Working position
H Lifting direction
R Rest position
S1 First sensor signal
S2 Second sensor signal

The invention claimed is:

1. Lifting apparatus (10) comprising:
a lifting part (11) that can be moved in a lifting direction (H) between a working position (A) and a rest position (R), said lifting part having arranged on it a support unit (13) for supporting a workpiece or a clamping unit for mounting the workpiece,
at least one drive device (18) arranged on a base part (17), said drive device comprising a toggle lever mechanism (22) and a drive (19) coupled with the toggle lever mechanism (22), wherein the toggle lever mechanism (22) comprises a first toggle lever (22a) hinged to the lifting part (11) and a second toggle lever (22b) hinged to the base part (17), said toggle levers (22a, 22b) being connected to each other on a toggle joint (31),
a positioning device (40) that prespecifies the working position (A) of the lifting part (11) in such a manner that the toggle levers (22a, 22b) are located outside an extending position of the toggle levers,
wherein the positioning device (40) has a stop surface (41) facing the lifting part (11), said stop surface abutting against a contact surface (60) of the lifting part (11) in the working position (A),
wherein the positioning device (40) comprises a pylon (43) that, starting from the base part (17), extends through a cutout (50) in the lifting part (11) and bears, on an end of the pylon facing away from the base part (17), an abutment part (42) having the stop surface (41).

2. Lifting apparatus as in claim 1,
wherein the positioning device (40) comprises an adjustment arrangement (44) configured to adjust a distance between the base part (17) and the stop surface (41).

3. Lifting apparatus as in claim 1,
wherein at least one positioning projection (61) is provided on one of the stop surface (41) and the contact surface (60), said at least one positioning projection interacting with an at least one corresponding positioning indentation (62) on the other of the stop surface and the contact surface.

4. Lifting apparatus as in claim 3,
wherein the at least one positioning projection (61) comes into engagement with the corresponding positioning indentation (62) when the lifting part (11) is in a working position (A) thereof, so that the lifting part (11) is positioned defined by the positioning device (40) in a direction transverse to the lifting direction (H).

5. Lifting apparatus as in claim 1,
wherein there exist two drive devices (18).

6. Lifting apparatus as in claim 1,
wherein the pylon (43) of the positioning device (40) is arranged between two toggle lever mechanisms (22).

7. Lifting apparatus as in claim 1,
wherein the at least one drive device (18) comprises a controllable drive (19) or a manually operable drive.

8. Lifting apparatus as in Claim 1,
wherein the at least one drive device comprises a controllable drive which comprises a double-acting fluid cylinder (20) including a piston rod (21) that is in contact with the toggle joint (31) of the toggle lever mechanism (22).

9. Lifting apparatus as in claim 8,
wherein the fluid lines (24) connected to the fluid cylinder (20) contain a throttle (24a).

10. Lifting apparatus as in claim 7,
wherein the at least one drive device (18) comprises a fluid control unit (25) that is disposed to also apply a fluid pressure to a fluid cylinder (20) when the lifting part (11) is in a working position (A) or in a rest position (R).

11. Lifting apparatus as in claim 1,
wherein the at least one drive device (18) comprises a sensor unit (65) configured to detect the working position (A) or the rest position (R).

12. Lifting apparatus as in claim 1,
further comprising an auxiliary drive (70) comprising a deformable body (71), wherein said auxiliary drive, due to deformation of the body (71) in the rest position (R) of the lifting part (11), is configured to provide an auxiliary force to move the lifting part (11) out of the rest position (R).

13. Lifting apparatus as in claim 1, wherein the lifting part (11) is linearly guided in the lifting direction (H) by a guide arrangement (55).

* * * * *